(12) United States Patent
Lazarewicz et al.

(10) Patent No.: US 11,143,277 B2
(45) Date of Patent: Oct. 12, 2021

(54) ROTOR HUB FOR FLYWHEEL ENERGY STORAGE SYSTEM

(71) Applicant: Helix Power Corporation, Somerville, MA (US)

(72) Inventors: Matthew L. Lazarewicz, Boxford, MA (US); Eric R. Larson, Spring Valley, OH (US); Jay L. Cummings, Cincinnati, OH (US)

(73) Assignee: Helix Power Corporation, Somerville, MA (US)

( * ) Notice: Subject to any disclaimer, the term of this patent is extended or adjusted under 35 U.S.C. 154(b) by 0 days.

(21) Appl. No.: 16/577,689

(22) Filed: Sep. 20, 2019

(65) Prior Publication Data
US 2021/0088117 A1 Mar. 25, 2021

(51) Int. Cl.
*F16H 33/02* (2006.01)
*H02K 7/02* (2006.01)

(52) U.S. Cl.
CPC ............. *F16H 33/02* (2013.01); *H02K 7/025* (2013.01); *Y02E 60/16* (2013.01)

(58) Field of Classification Search
CPC ................................. F16H 33/02; H02K 7/025
See application file for complete search history.

(56) References Cited

U.S. PATENT DOCUMENTS

| | | |
|---|---|---|
| 5,566,588 A | 10/1996 | Bakholdin et al. |
| 5,628,232 A | 5/1997 | Bakholdin et al. |
| 5,946,979 A * | 9/1999 | Waagepetersen ..... F16F 15/305 74/572.12 |
| 5,969,446 A | 10/1999 | Eisenhaure et al. |
| 6,014,911 A * | 1/2000 | Swett .................. F16F 15/3153 74/572.12 |
| 6,175,172 B1 * | 1/2001 | Bakholdin .............. B60L 50/30 310/74 |
| 6,762,520 B1 | 7/2004 | Ehrhart et al. |
| 8,868,753 B2 | 10/2014 | Luna |
| 9,641,051 B2 | 5/2017 | Kalev et al. |
| 9,816,583 B2 | 11/2017 | Bäumer |
| 9,843,237 B2 | 12/2017 | Kalev |
| 10,050,491 B2 | 8/2018 | Groves et al. |
| 2006/0053959 A1 * | 3/2006 | Park ...................... F16F 15/315 74/572.2 |
| 2010/0018344 A1 | 1/2010 | Spears et al. |

(Continued)

FOREIGN PATENT DOCUMENTS

| | | |
|---|---|---|
| EP | 3219487 A1 | 9/2017 |
| EP | 3 474 418 A1 | 4/2019 |
| WO | 2016/032839 A1 | 3/2016 |

OTHER PUBLICATIONS

International Searching Authority/EP, International Search Report and Written Opinion of the International Searching Authority, Application No. PCT/US2020/051710, dated Jan. 29, 2021, 9 pages.

(Continued)

*Primary Examiner* — Vicky A Johnson
(74) *Attorney, Agent, or Firm* — Sunstein LLP

(57) ABSTRACT

Rotor hubs described herein include a frustoconical body having a base, a frustum, and a longitudinal axis extending therebetween, and a plurality of elongated protrusions spaced about a circumference of the base and extending from the base parallel to the longitudinal axis.

14 Claims, 18 Drawing Sheets

(56) References Cited

U.S. PATENT DOCUMENTS

2016/0169323 A1    6/2016   Tarrant et al.
2017/0279335 A1    9/2017   Bender et al.

OTHER PUBLICATIONS

International Searching Authority/EP, International Search Report and Written Opinion of the International Searching Authority, Application No. PCT/US2020/051711, dated Feb. 2, 2021, 10 pages.
International Searching Authority/EP, International Search Report and Written Opinion of the International Searching Authority, Application No. PCT/US2020/051709, dated Mar. 4, 2021, 12 pages.

\* cited by examiner

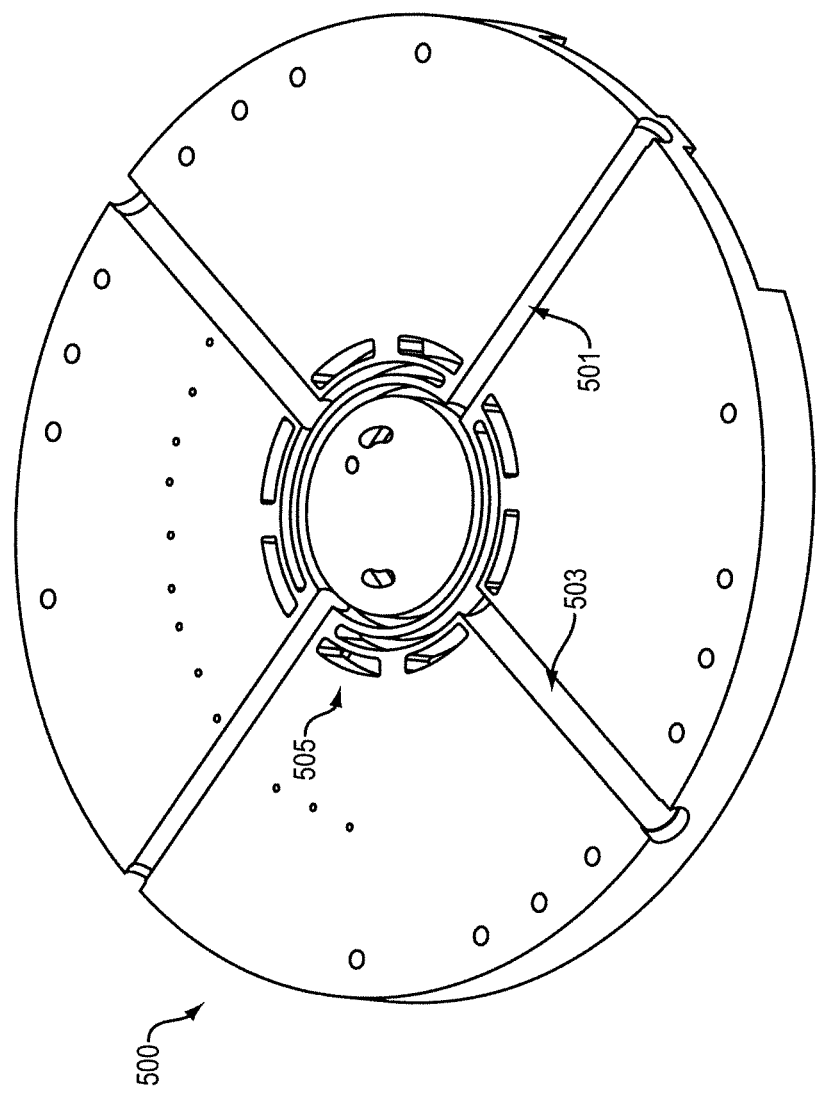

ROTOR HUB FOR FLYWHEEL ENERGY STORAGE SYSTEM

FIELD OF THE INVENTION

This invention relates to flywheels and more particularly to rotor hubs for flywheels.

BACKGROUND OF THE INVENTION

Flywheels have conventionally been used in connection with applications requiring stored energy. Many such applications are in the electrical power industry, particularly where short duration, high power output is required over many cycles throughout years of continuous operation. More generally, flywheels are useful where power fluctuations need to be managed or energy needs to be stored. Flywheel applications typically fall into three classifications: 1) power management, 2) energy balancing, and 3) persistent energy storage applications. These classifications can cover a broad array of applications, including, for example, rapid transit power management, mining, industry, renewables integration, grid frequency regulation, pulsed power, electromagnetic aircraft launch, rotary UPS (uninterrupted power supply), and material handling. The storage duration (cycle time) and cyclic life requirements of each application can vary widely.

For some applications, flywheels can replace batteries (e.g., lithium ion) and capacitors/ultra-caps for more efficient energy storage and power management. For example, for high-cycle and/or long-term storage applications, batteries generally cannot meet life and performance requirements. Additionally, capacitors, even if requirements can be met, are generally more expensive than flywheels for similar or lesser performance.

However, because of conventionally performance-stealing, cost-prohibitive challenges associated with increasing scale, there is a large, mostly untapped market for flywheels in power management applications requiring high cyclic content and rapid transient response times (e.g., rapid transit or grid integration for wind and solar). For such high-power, rapid-cycle flywheel applications (e.g., wherein power inputs and outputs of 1MW to 10MW are required to be rapidly cycled over a transient response time between 10 seconds to five (5) minutes), a large drive-motor/generator is required. Such motor/generators require more complex magnet arrays and power control systems to manage increased size, speed, and power as well as more complex and robust mechanical and cooling systems to withstand the increased stresses and dissipated heat associated with the increased size, speed, and power. Furthermore, wear and tear associated with such rapid cycling can substantially limit cyclic life and increase maintenance requirements for the flywheel, thus driving high replacement costs and resulting in significant maintenance downtime.

SUMMARY OF INVENTION

It is an object of the invention to provide a continuously operable, high cycle-life flywheel system scalable for high power, rapid cycle applications.

In one aspect a rotor hub is provided. The rotor hub includes a frustoconical body having a base, a frustum, and a longitudinal axis extending therebetween. The rotor hub also includes a plurality of elongated protrusions spaced about a circumference of the base and extending from the base parallel to the longitudinal axis.

In some embodiments, a terminal end of each elongated protrusion includes a contact surface for contacting a mating surface of a rotor. In some embodiments, upon rotation of the rotor hub and the rotor, the elongated protrusions are configured to flex radially outward to maintain contact between the contact surfaces and the mating surface of the rotor and to maintain concentricity between the rotor hub and the rotor. In some embodiments, the frustoconical body includes an opening angle of 50 degrees. In some embodiments, the rotor hub is constructed from at least one of a metal, a composite, or combinations thereof. In some embodiments, the rotor hub is constructed from at least one of aluminum or an aluminum alloy. In some embodiments, the frustoconical body and the plurality of elongated protrusions are constructed as a single-piece rotor hub. In some embodiments, an inner diameter of the frustum is configured to interconnect to a rotor shaft. In some embodiments, the protrusions extend parallel to the longitudinal axis from the base toward the frustum.

In some embodiments, the plurality of elongated protrusions includes 24 elongated protrusions evenly spaced about the circumference of the base. In some embodiments, each of the plurality of elongated protrusions is six (6) inches long. In some embodiments, each of the plurality of elongated protrusions is 0.5 inches thick. In some embodiments, each of the plurality of elongated protrusions is 1.2 inches wide. In some embodiments, each of the contact pads is 1.5 inches long. In some embodiments, each of the plurality of contact pads is 1.1 inches thick. In some embodiments, each of the plurality of contact pads is 1.2 inches wide.

BRIEF DESCRIPTION OF THE FIGURES

Embodiments of the present disclosure will now be described, by way of example only, with reference to the attached Figures, wherein:

FIGS. 12A, 12B, and 12C are top perspective, bottom perspective, and cross-sectional top perspective views of a flywheel baseplate in accordance with various embodiments.

DETAILED DESCRIPTION OF THE INVENTION

Figure 1:
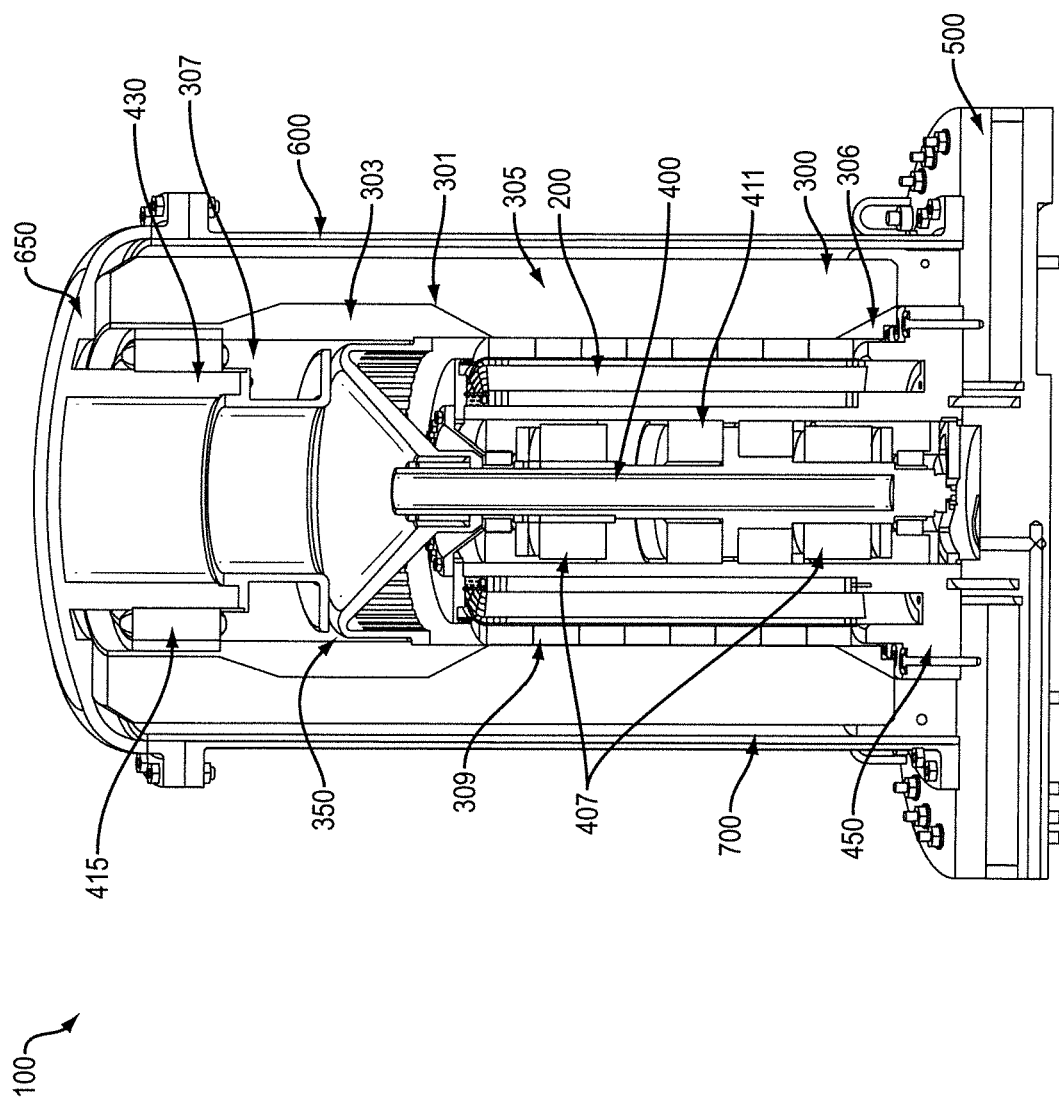
FIG. 1 is a cross-sectional view of a flywheel energy storage system in accordance with various embodiments.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments, as the skilled artisan would recognize, even if not explicitly stated herein.

Descriptions of well-known components and processing techniques may be omitted to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Provided herein are continuously operable, high cycle-life flywheel systems scalable for high power, rapid cycle applications. More particularly, referring now to FIG. 1, in some embodiments, an "inside-out" flywheel assembly 100 (hereinafter "flywheel") is provided wherein a stator assembly 200 is positioned internal to a composite rotor 300 for rotation about the stator assembly 200. Cooling can be provided via internally cooled stator poles 203 of the stator assembly 200, the stator poles 203 configured to redirect coolant into fluid contact with windings 207 of the stator assembly 200. Concentricity of the rotor 300 can be regulated by a circumferentially expandable rotor hub 350 for maintaining operative engagement between the composite rotor 300 and a rotor shaft assembly 400 extending along a longitudinal axis of the flywheel 100. Generally, the shaft assembly 400 can be positioned within a bearing housing 450 within the stator assembly 200. The entire flywheel assembly 100, in some embodiments, can generally be enclosed by a housing flywheel 600 mounted between a baseplate 500 and a lid 650. In some embodiments, a floating containment liner 700 can be provided about the rotor 300 to retain the rotor 300 in the event of mechanical failure.

Stator Assembly

Referring now to FIGS. 2A, 2B, 3, and 4, stator assembly 200 includes an inner body 201 extending along a longitudinal axis between a first end and a second end, an outer body 203 extending around and along the inner body 201, and a plurality of stator poles 205 extending radially therebetween. Each of the stator poles 205 includes one or more windings 207 extending therearound.

Figure 2B:
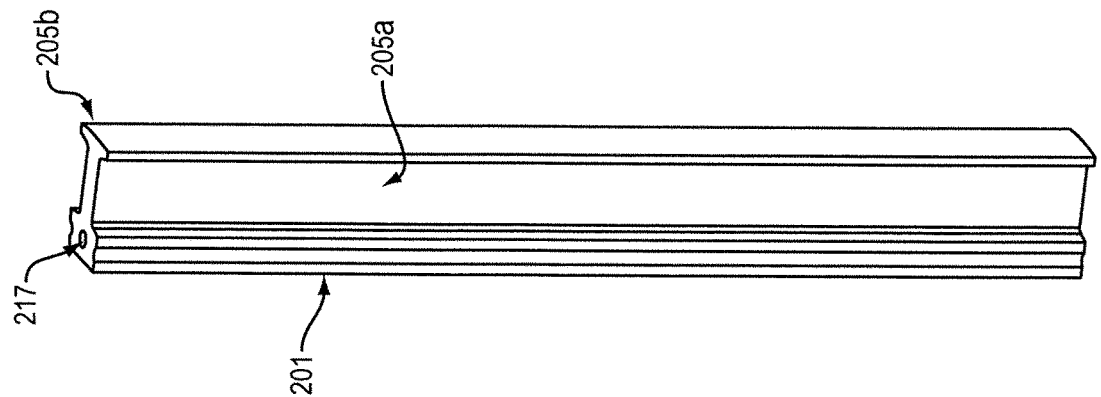
FIG. 2B is a perspective view of a single stator pole in accordance with various embodiments.
Figure 2A:
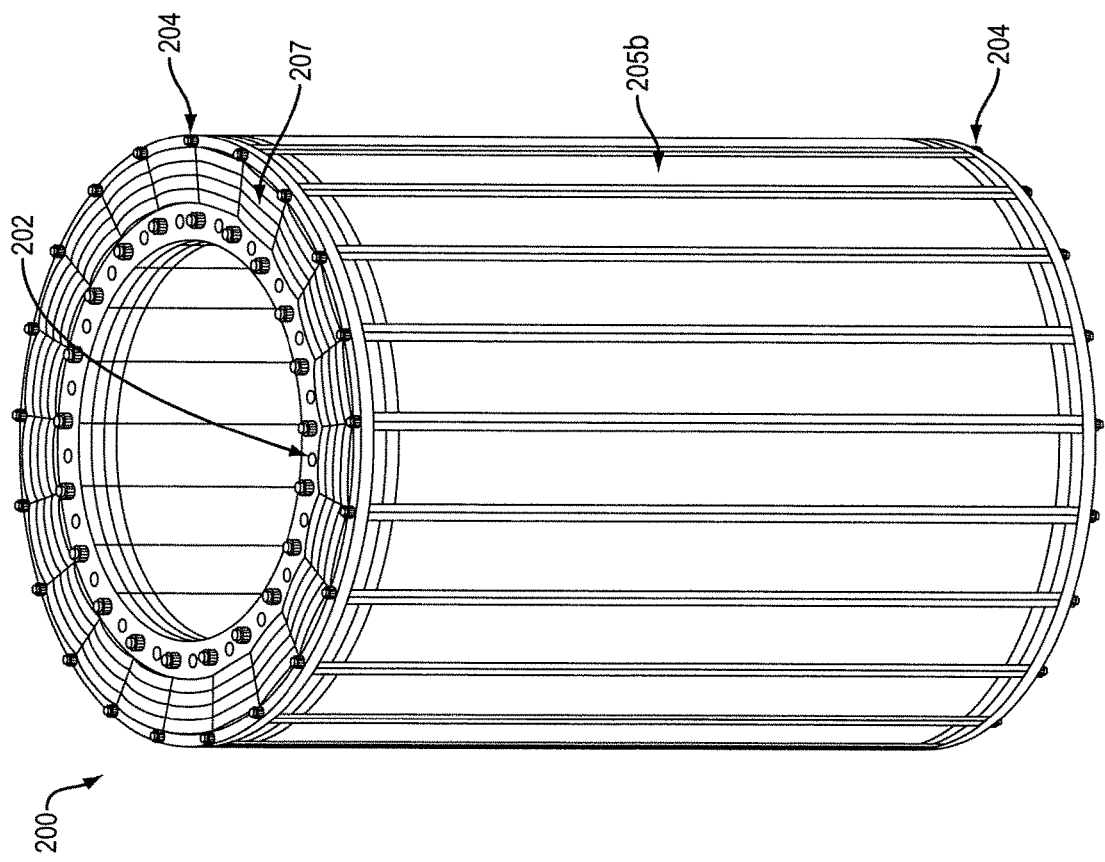
FIG. 2A is a perspective view of a flywheel stator assembly in accordance with various embodiments.
Figure 3:
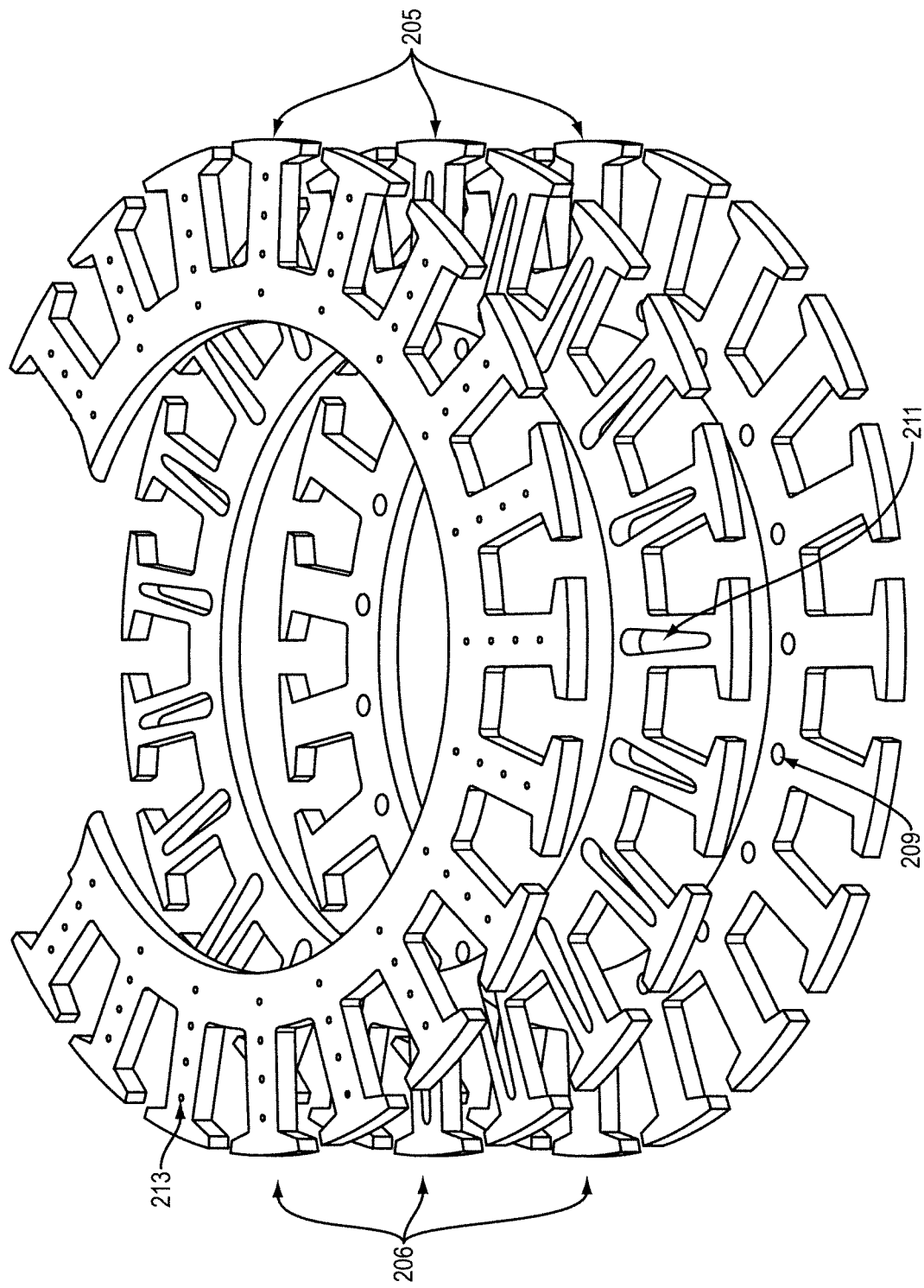
FIG. 3 is an exploded view of a plurality of composite lamination layers used to construct the flywheel stator assembly in accordance with various embodiments.
Figure 4:
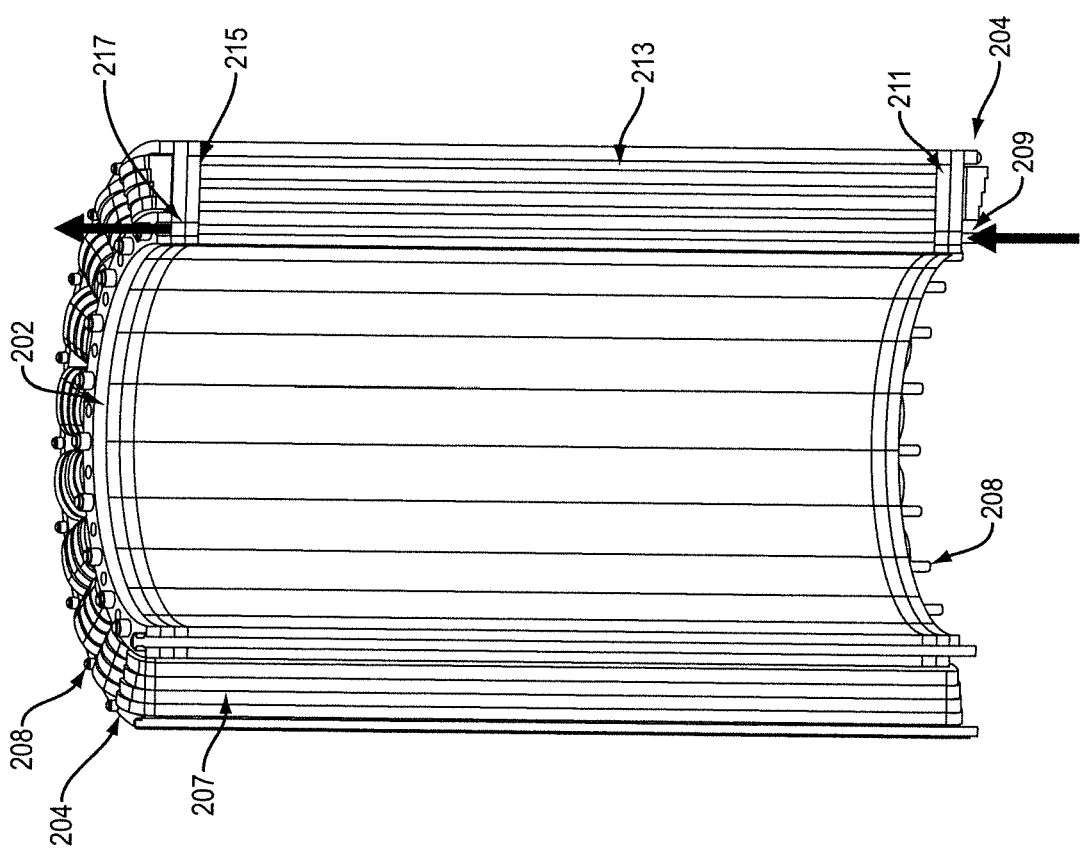
FIG. 4 is a cross-sectional view of the flywheel stator assembly illustrating a coolant flowpath formed therein in accordance with various embodiments.

In some embodiments, the inner body 201 and stator poles 205 can be integrally formed as shown, for example in FIG. 3. In such embodiments, the stator assembly 200 can, for example, include the circular inner body 201 having a plurality (e.g., 21 as shown) of integral stator poles 205 extending therefrom. Each stator pole 205, as shown in FIGS. 2B and 3, can include a tooth 205a and a slot 205b. As shown in FIGS. 2A and 4, the windings 207 can generally be wrapped about the tooth 205a and the slot 205b can both add structural stiffness to the stator pole 205 and operate to retain the windings 207 thereon.

Referring again to FIG. 3, in some embodiments, in order to facilitate the formation of variant internal structures (e.g., inlet 209, inlet plenum 211, internal passages 213, outlet plenum 215, and outlet 217 described below) and to reduce eddy currents within the stator assembly 200, the integrated inner body 201 and stator poles 205 can be formed by a stacked lamination of a plurality of stator layers 206. For example, in some embodiments, the stacked lamination can be made up of 1160 stator layers 206, each lamination being 0.025" thick and defining a portion of the inner body 201 and 21 integrated stator poles 205. However, it will be apparent in view of this disclosure that stacked laminations, in accordance with various embodiments, can include any number of integrated stator poles 205 and any suitable number of stator layers 206, each layer having any suitable thickness. Each stator layer 206 can be constructed of any suitable material for use in connection with a stator of an electrical motor/generator such as, for example, AK electrical steel, any cold-rolled ferromagnetic steel, any other ferromagnetic material capable of being formed into a plurality of stacked laminations, or combinations thereof.

In some embodiments, as shown in FIGS. 2A and 4, the stacked lamination of the stator assembly 200 can be secured by way of an inner ring bracket pair 202 overlaying the inner body 201 at the first and second ends of the stator assembly 200 and by an outer ring bracket pair 204 overlaying the slot 205b at the first and second ends of the stator assembly 200. Each of the inner and out ring bracket pairs can be connected (e.g., by tie bolts 208 as shown) to compress and secure the stacked lamination to form the inner body 201 and the stator poles 205.

The windings 207 can generally be wound about the tooth 205a of each stator pole 205. The windings 207 can be formed from any suitable winding wire, including, for example, Litz type 8 wire. As shown in FIGS. 2A and 4, the stator assembly 200 can include three (3) turns of a 14 Litz wire bundle around each stator pole 205 tooth 205a, thus providing 42 Litz wires wrapped around each stator pole 205. However, it will be apparent in view of this disclosure that, in accordance with various embodiments, bundles having any number of Litz wires can be turned around each stator pole 205 tooth 205a any number of times.

Figure 14:
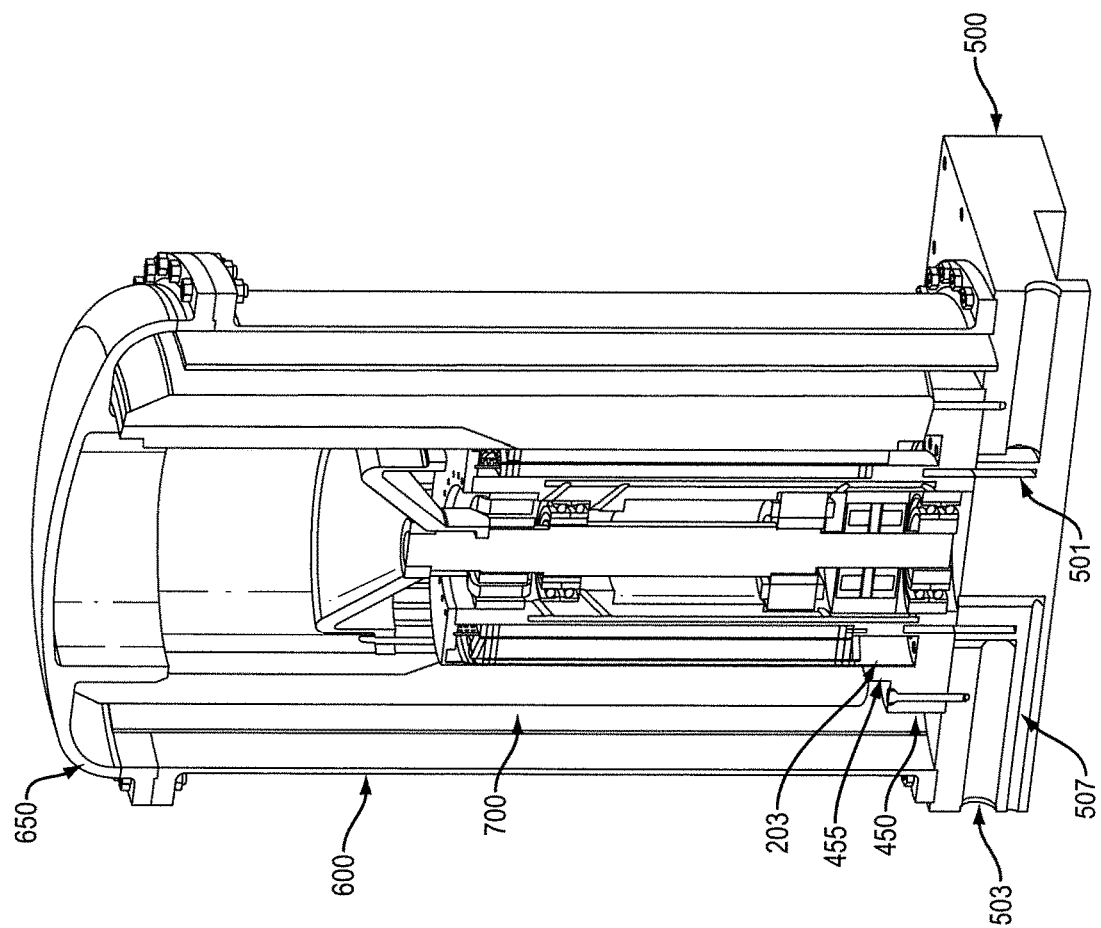
FIG. 14 is a cross-sectional view of a flywheel assembly having a containment liner in accordance with various embodiments.

As best shown in FIGS. 2B and 14, the outer body 203 can generally extend around the slots 205b and outer ring bracket pair 204 for forming an outer diameter of the stator assembly 200. As shown, the outer body 203 is a separate element from the inner body 201 and stator poles formed by the stacked lamination. However, it will be apparent in view of this disclosure that, in accordance with various embodiments, the outer body can be integrally formed with the stacked lamination and/or the outer ring bracket pair 204 or can otherwise be bonded thereto (e.g., by welding, adhesive bonding, brazing, or any other suitable means).

As shown and described herein, the stacked lamination and outer body are constructed to form a stator assembly 200 of about 30" in length, an outer diameter of about 20", and an inner diameter of about 13". However, it will be apparent in view of this disclosure that the stator assembly 200 can be constructed to have any length, outer diameter, and/or inner diameter according to electrical, mechanical, and/or thermal requirements of each particular flywheel 100. For example, the outer diameter can generally be matched to an inner diameter of a motor magnet array 309 of the rotor 300 to achieve a prescribed gap therebetween at the stator 200-rotor 300 interface.

Stator Cooling

As noted herein above, large scale electric motor/generators produce significant excess thermal energy (heat), which must be dissipated during operation. However, direct cooling of the rotor 300-stator 200 interface is impossible because electric motor/generators generally require such interface to be maintained at vacuum pressure. Also, due to the high rotational speed of the rotor 300, direct cooling of the rotor is generally impractical. Smaller conventional flywheel systems sometimes provide cooling of a cylindrical core of a stator assembly to serve as a heat sink for the stator poles. However, such systems are not scalable because larger stator poles and higher power inputs and outputs generate substantially more heat, thus rendering core heat sinks progressively less effective.

As provided herein, such cooling challenges are overcome by a multi-function cooling of the stator assembly 200. In particular, referring now to FIGS. 4, 6A, and 6B, the stator assembly 200 provides for scalable cooling of the flywheel 100 sufficient for cooling large, high power systems. Generally, the stator assembly 200 facilitates both internal cooling of the stator poles 205 and direct fluid contact cooling of the windings 207 by flowing coolant up through the stator poles 205 and then redirecting that flow down over the windings 207 between the inner body 201 and the outer body 203.

Figure 5:
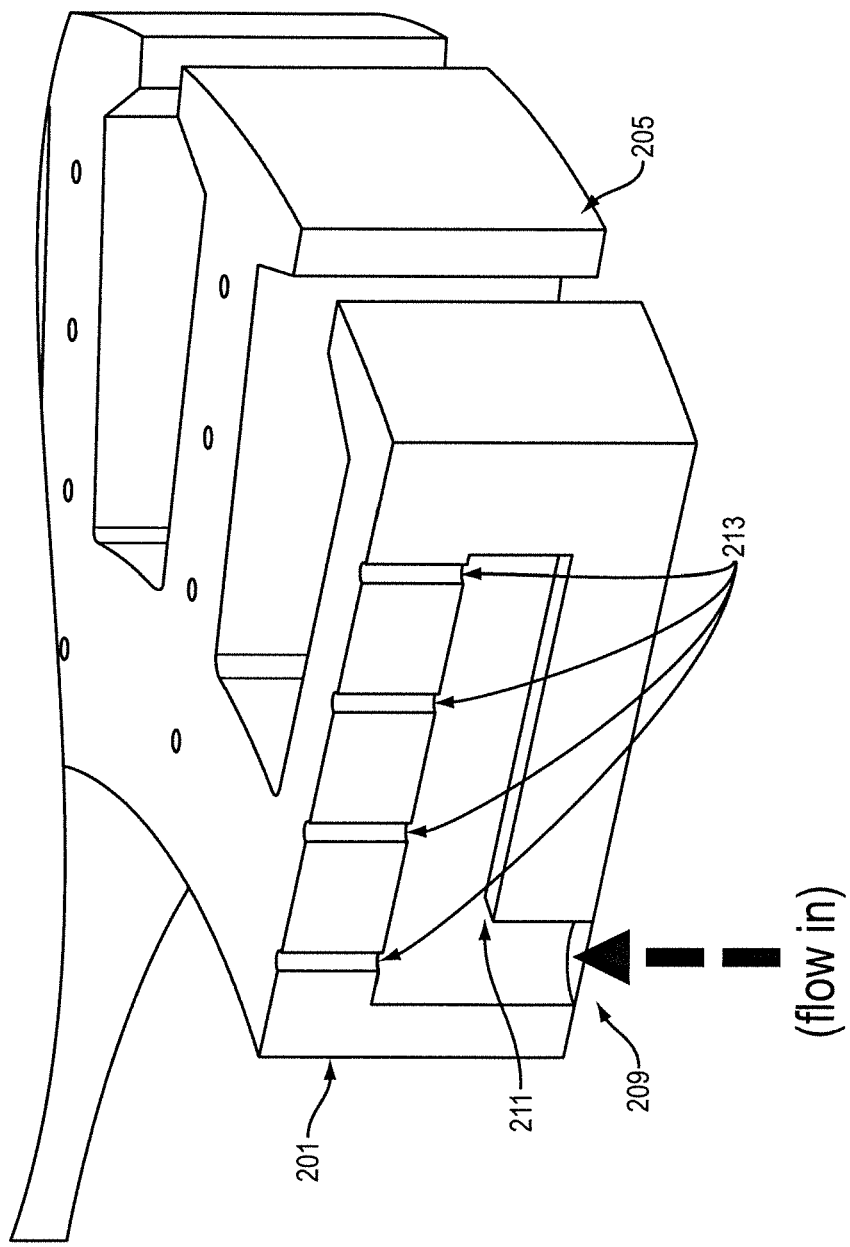
FIG. 5 is a cross-sectional detail view of an inlet plenum of a stator pole in accordance with various embodiments.

As shown in FIGS. 3 and 4, coolant flows into each stator pole 205 at a first end of the stator assembly 200 via an inlet 209 formed in the inner body 201 proximate a root of each respective stator pole 205. As best shown in FIG. 5, coolant can then flow from the inlet 209 into an inlet plenum 211 for distribution along a radial length of the stator pole 205 to permit subsequent flow into one or more of a plurality of internal passages 213. Referring again to FIG. 4 internal passages 213 generally extend within each stator pole 205 along a longitudinal length thereof to provide internal cooling of the stator poles 205. Coolant exiting the internal passages 213 can flow into an outlet plenum 215 and then exit the stator pole 205 via an outlet 217 formed in the inner body 201 at the second end of the stator assembly 200.

Figure 6A:
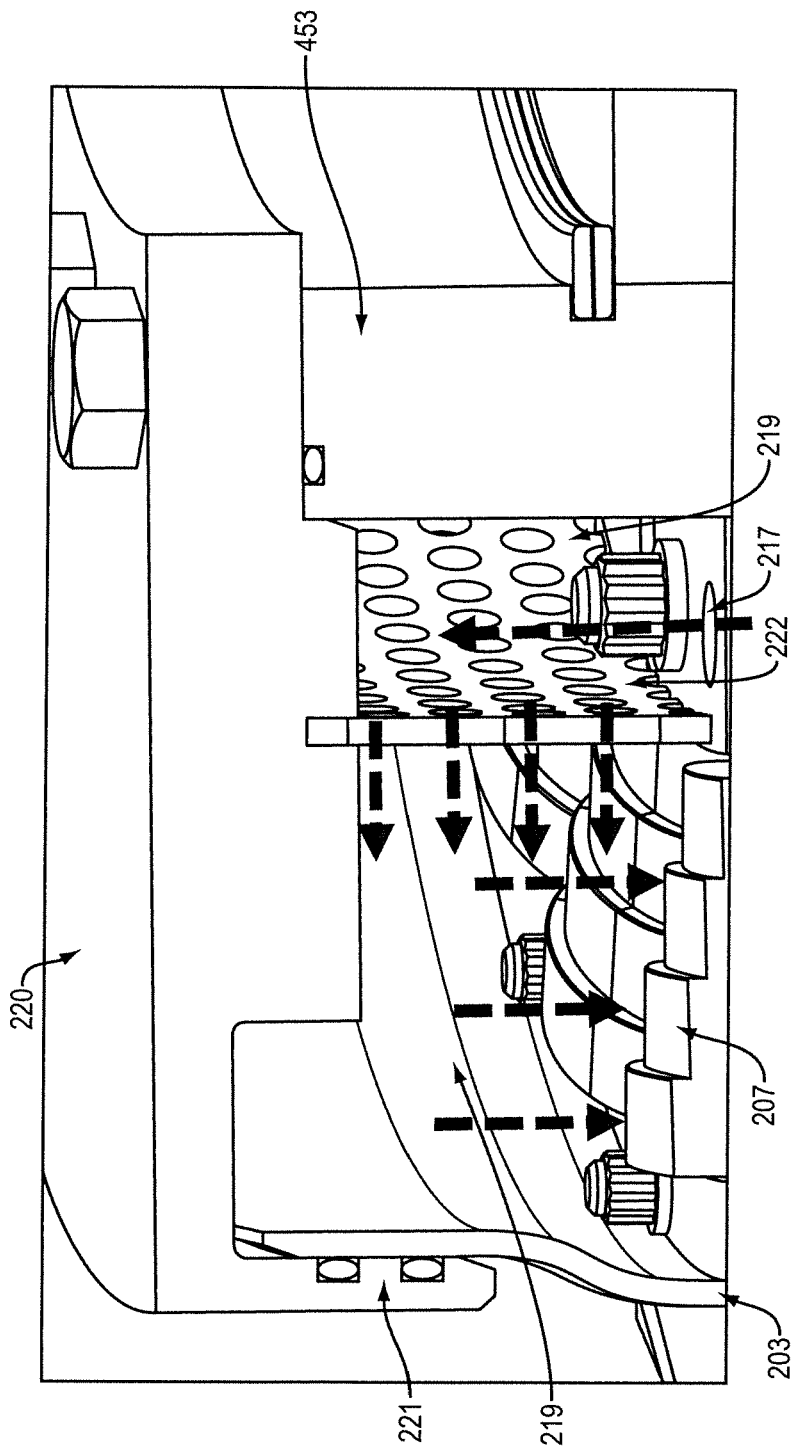
FIG. 6A is a detail cross-sectional side view of a stator-plenum chamber assembly in accordance with various embodiments.
Figure 6B:
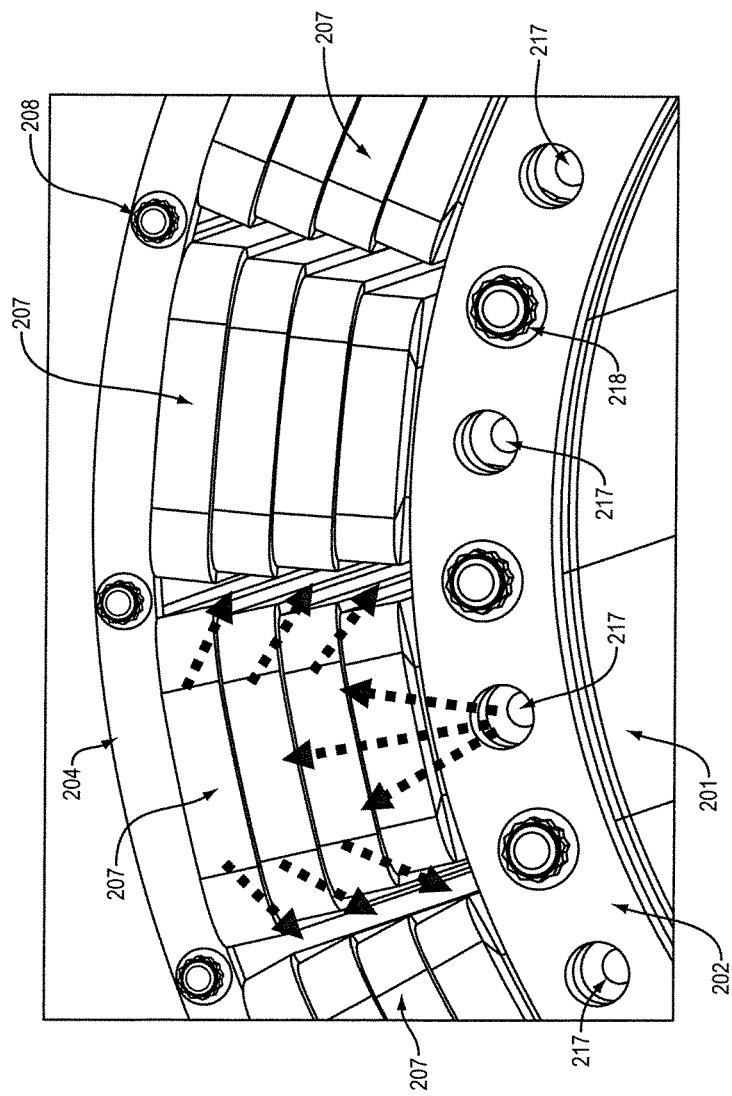
FIG. 6B is a detail top view of the stator assembly in accordance with various embodiments.

As best shown in FIGS. 6A and 6B, coolant exiting the outlet 217 can then enter a plenum chamber 219 configured to redirect the flow back toward the first end of the stator assembly 200 and into fluid contact with the windings 207 between the inner body 201 and the outer body 203. The plenum chamber 219 can generally be defined between the outer body 203, a plenum cap 220, and a bearing containment column 453 of the bearing housing 450

In some embodiments, a spray bar 222 or other diffuser can be radially interposed in the plenum chamber 219 between the outlet 217 and the windings 207 to distribute the coolant flowing into fluid contact with the windings 207. Despite the coolant flowing into direct fluid contact with the windings 207 external to the stator poles 205, the pumped vacuum at the stator 200-rotor 300 interface is maintained because, as described above, the outer body 203 is, as best shown in FIG. 6A, sealed against a plenum flange 221 of the plenum chamber 219 at the second end of the stator assembly 200 and, as best shown in FIG. 14, sealed against the sealing flange 455 of the bearing housing 450 at the first end. Thus, no coolant can flow or leak into the stator 200-rotor 300 interface.

The described stator cooling configuration advantageously provides enhanced heat dissipation as compared to conventional cooled inner cores. Initially, conventional cooled inner cores are inherently spaced apart from the stator-rotor interface by the radial length of any stator poles. Therefore, the larger the scale, the larger the stator poles and the less effective the cooling. By contrast, the cooled stator poles 205 of the stator assembly 200 described herein provide a more robust heat sink closer to the vacuum pumped stator 200-rotor 300 interface. Furthermore, the direct fluid contact cooling of both the windings 207 and, incidentally, the outer body 203, provides additional cooling of the motor/generator components and the stator 200-rotor 300 interface during operation of the flywheel 100.

Composite Rotor

Referring again to FIG. 1, a composite rotor 300 generally provides the energy storage for the flywheel 100. In particular the flywheel 100, when storing energy, acts as an electric motor to spin the flywheel 100 at high RPM, thereby converting the input electric energy into rotational kinetic energy stored in the rotor 300. Then, when the flywheel 100 needs to output the stored energy, the flywheel 100 reverses polarity to act as an electrical generator, thereby converting the stored kinetic energy back into electrical energy for delivery to a system having an electrical demand.

The composite rotor 300 can include a rotor body 301 extending along the longitudinal axis of the flywheel 100 and around the stator assembly 200. The rotor body 301 includes a first component 303 constructed of a first material and extending along at least a portion of the rotor body 301 and a second component 305 constructed of a second material and extending longitudinally along at least a portion of the rotor body 301 such that at least a portion of the second component 305 is disposed concentrically around the first component 303.

In some embodiments, the rotor body 301 can further include a third component 306 longitudinally spaced apart from the first component and also having a portion of the second component 305 disposed concentrically therearound. For example, as shown in FIG. 1, the third component 306 can be positioned at the base of the rotor body 301 proximate the bearing housing 450. In some embodiments, as shown, for example, in FIG. 1, at least a portion of the third component can extend concentrically around the sealing flange 455 of the bearing housing 455.

In combination, the first component 303 and the second component 305, and any additional components such as the third component 306, form the rotor body 301. The rotor body 301 can generally include an internal region 307 defined by an inner diameter of the rotor body 301. In general, the rotor body 301 can preferably extend along the longitudinal axis at least partially coincident with the stator assembly 200. For example, as shown in FIG. 1, the stator assembly 200 can be positioned entirely within the internal region 307 of the rotor body 301. This positioning advantageously permits the stator poles 205 and windings 207 to interact with one or more motor magnets 311 of a magnet array 309 (e.g., a Halbach cylinder) disposed along the inner diameter of the rotor body 301 (see FIGS. 7A and 7B).

The inner diameter of the rotor body 301 can generally be sized such that a prescribed gap is maintained between an inner diameter of the magnet array 309 and the outer diameter of the stator array 200 at the stator 200-rotor 300 interface. An outer diameter of the rotor body can generally be configured to provide sufficient thickness to withstand operational conditions (e.g., high speed rotation) and further configured, in combination with rotor body 301 length, to provide a rotor body 301 of sufficient mass to store the desired quantity of energy. For example, in the embodiment shown in FIG. 1, the overall rotor body 301 is about five (5) feet long and includes an outer diameter of about three (3) feet and an inner diameter of about two (2) feet.

As shown in FIG. 1, although an overall thickness of the rotor body is generally consistent, the radial thicknesses of the first component 303 and the second component 305 vary along the longitudinal axis. For example, as shown in FIG. 1, the second component 305 defines an internal recess with the first component 303 disposed therein. Such variation, in some embodiments, can be driven by differing load conditions along the length of the rotor body 301. In that regard, generally, radial growth of the rotor body 301 under rotational load, both at the inner and outer diameters, should be uniform during operation of the flywheel. Otherwise, at full rotational speed, the rotor 300 will be imbalanced, limiting flywheel 100 performance and potentially causing mechanical failure. However, different portions of the rotor body 301 experience different levels of stress during operation of the flywheel 100. For example, the motor magnets 311 of the magnet array 309 are disposed along at least a portion of the rotor body 301 and create a "dead load" (i.e. not a self-supporting load) in that area, which the rotor body 301 needs to support. Similarly, other portions of the rotor body 301 may bear against and be at least partially supported by a rotor hub 350. Thus, for example, the hoop stiffness may need to be greater in some locations than in others. Accordingly, the varying thicknesses of the first component 303 and the second component 305 can, in some embodiments, be configured to withstand variant loads while providing uniform radial growth of the rotor body 301 during operation of the flywheel 100.

In addition, such a multi-component, varying thickness construction is impossible in conventional multi-component rotors. In particular, conventional multi-component rotors require a press fit between the components, which necessarily dictates only cylindrical components of constant thickness. Furthermore, in such configurations, the press fit is prone to loosening over time as the rotor material relaxes. As the press fit loosens, the components can rotate at different speeds, potentially causing loss of flywheel performance and/or mechanical failure.

The rotor body 301 of the composite rotor 300 described herein is able to achieve such a configuration because the first component 303 is constructed of a first fiber-reinforced composite and the second component 305 is constructed of a second fiber-reinforced composite. More particularly, the rotor body 301 is constructed by overwinding the first fiber-reinforced composite of the first component 303 with the second fiber-reinforced composite of the second component 305 as appropriate to match a desired thickness variation profile.

In some embodiments, where, for example, the fiber-reinforced composite of the first component 303 and the fiber-reinforced composite of the second component 305 require different resin matrixes, the overwinding can be executed by first applying the resin matrix of the first component 303 to wet and/or cure the reinforcing fibers of the first component 303, overwinding the first component 303 with the reinforcing fibers of the second component 305, and then applying the resin matrix of the second component 305. Alternatively, in some embodiments, where, for example, a common resin matrix can be used for the fiber-reinforced composites of both the first component 303 and the second component 305, the dry reinforcing fibers of the first component 303 can be overwound with the dry reinforcing fibers of the second component 305. The common resin matrix can then be applied to the dry reinforcing fibers of both components 303, 305 together.

Thus, because the first component 303 is overwound by the second component 305, the components are permanently bonded and will never separate. Furthermore, because the first component 303 is overwound by the second component 305, thereby obviating any need to press the first component 303 into the second component 305, each component can exhibit varying thicknesses along the length of the rotor body 301.

The fiber-reinforced composites of the first component 303 and the second component 305 can be any suitable composite. For example, the reinforcing fibers of the first and second fiber-reinforced composites can include at least one of a glass fiber, an aramid fiber, a carbon fiber, a quartz fiber, a boron fiber, a ceramic fiber, a natural fiber, any other suitable fiber, or combinations thereof. Also for example, the resin matrix of each of the first and second fiber-reinforced composites can include at least one of a polyester resin, a vinylester resin, an epoxy resin, a phenolic, a cyanate ester, a silicone, a polyurethane, a bismaleimide, a polyimide, any other suitable resin matrix, or combinations thereof.

In some embodiments, the reinforcing fiber of the first fiber-reinforced composite can include a glass reinforcing fiber and the reinforcing fiber of the second fiber-reinforced composite can include a carbon reinforcing fiber. In some embodiments, for example, the second component 303 can be made of wound T700 composite material with a +/−89-degree fiber weave and a binder of PPG resin and the first component 303 can be made of fiberglass.

Motor Magnets

As noted above and shown in FIGS. 7A and 7B, a magnet array 309 comprising a plurality of magnets 311 is generally disposed about the inner diameter of the rotor body 301 along at least a portion of the length of the rotor body 301. The magnets 311 of the magnet array 309 generally provide, in combination with the stator poles 205 and windings 207, an electromagnetic source for the motor/generator of the flywheel. As described herein, the magnets 311 are permanent magnets. The magnets 311 of the magnet array 309 can generally be any suitable permanent magnet, including, for example, neodymium-iron-boron (NdFeB) magnets. In some embodiments, for example, the magnets 311 disposed on the inner diameter of the rotor body 301 can include epoxy bonded NdFeB magnets.

Figure 7B:
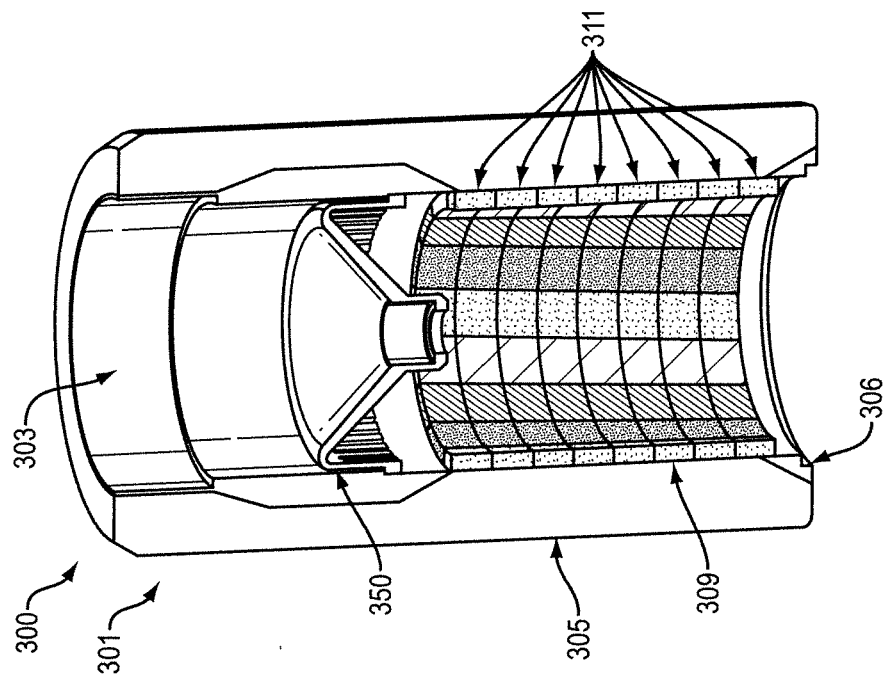
FIG. 7B is a cross-sectional view of the motor magnet array of FIG. 7A applied to an inner surface of a flywheel rotor in accordance with various embodiments
Figure 7A:
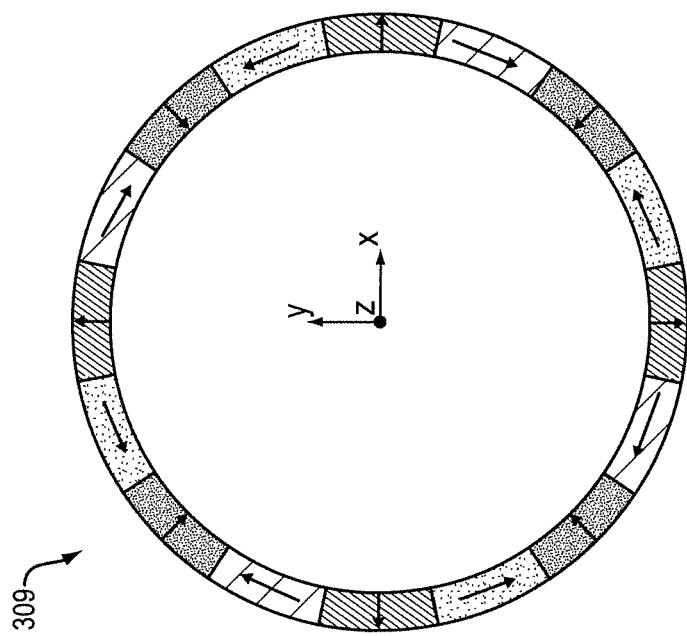
FIG. 7A is a circumferential map of a motor magnet array in accordance with various embodiments.

The magnets 311 of the magnet array 309 can generally be arranged in any number and manner suitable for producing magnetic flux sufficient to interact with the stator poles 205 and windings 207. As shown in FIGS. 7A and 7B, for example, the magnet array 309 includes 128 magnets 311 arrayed and skewed in a Halbach cylinder. As shown, the magnets 311 are bonded to the inner diameter of the composite rotor 300 at roughly a 24" diameter and over roughly 30" axial length. However, it will be apparent in view of this disclosure that the magnet array 309 can include any arrangement of any number of magnets 311 bonded over any length of any sized inner rotor diameter in accordance with various embodiments.

Rotor Hub

Figure 8:
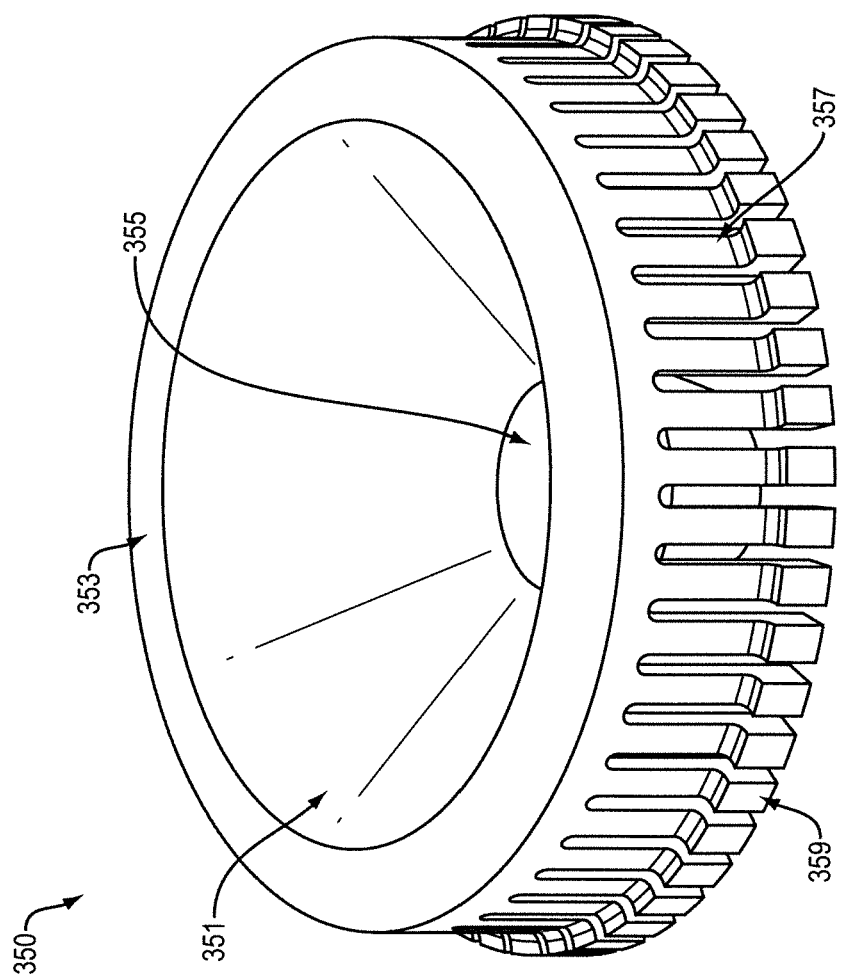
FIG. 8 is a perspective view of a flywheel rotor hub in accordance with various embodiments.

Referring now to FIG. 8, the rotor hub 350 is configured to provide a linkage between the composite rotor 300 and a rotor shaft 400, thereby providing overall system centrality for balance stability. In order to provide such overall system centrality, the rotor hub 350 is required to maintain contact with the inner diameter of the rotor body 301 at all times during operation. However, conventional rotor hubs can experience uneven radial growth at high rotational speeds, thus potentially losing contact with portions of the inner diameter of the rotor body 301 and/or losing balance stability.

The rotor hub 350 described herein includes a frustoconical body 351 extending along a longitudinal axis between a base 353 and a frustum 355. The frustum 355 is generally configured to interconnect at an inner diameter thereof with the rotor shaft 401. In some embodiments, a plurality of elongated protrusions 357 or "fingers", spaced about the circumference of the base 353 can extend from the base 353 parallel to the longitudinal axis and toward the frustum 355. In some embodiments, contact pads 359 are formed at a terminal end of each of the elongated protrusions 357 for contacting the inner diameter of the rotor body 301. Under rotation, the elongated protrusions 357 of the rotor hub 350 are configured to load and flex radially outward to maintain 360 degree contact between the contact pads 359 and the inner diameter of the rotor body 301 such that concentricity can be maintained between the rotor hub 350 and the rotor 300.

The rotor hub 350, including the frustoconical body 351, the elongated protrusions 357, and the contact pads 359, can generally be constructed as a single piece rotor hub 350. In general, the rotor hub 350 can be constructed from any suitable material, including, for example, composites and/or metals such as steel, aluminum, or alloys, or combinations thereof. In some embodiments, the rotor hub 350 can be constructed from a sufficiently flexible material to permit the fingers to grow radially during operation. For example, in some embodiments, the rotor hub 350 can be constructed of 7075 aluminum.

In accordance with various embodiments, the frustoconical body 351 can include a 50-degree cone angle to provide an enhanced outward radial load at speed. However, it will be apparent in view of this disclosure that any cone angle can be used in connection with the frustoconical body 351 in accordance with various embodiments.

As shown in FIG. 8, the rotor hub 350 can include 24 elongated protrusions 357. However, it will be apparent in view of this disclosure that the rotor hub 350 can include any number of elongated protrusions 357 in accordance with various embodiments. In particular, for the embodiment shown in FIG. 8, in some embodiments, each of the elongated protrusions 357 can be about six (6) inches long, about 0.5 inches thick, and about 1.2 inches wide. Furthermore, for the embodiment shown in FIG. 8, in some embodiments, each of the contact pads 359 can be about 1.5 inches long, about 1.1 inches thick, and about 1.2 inches wide. However, it will be apparent in view of this disclosure that, in accordance with various embodiments, as dictated by the size and configuration of the flywheel 100, the elongated protrusions 357 and contact pads 359 can be any suitable combination of lengths, thicknesses, and widths.

Shaft Assembly and Bearings

Figure 9:
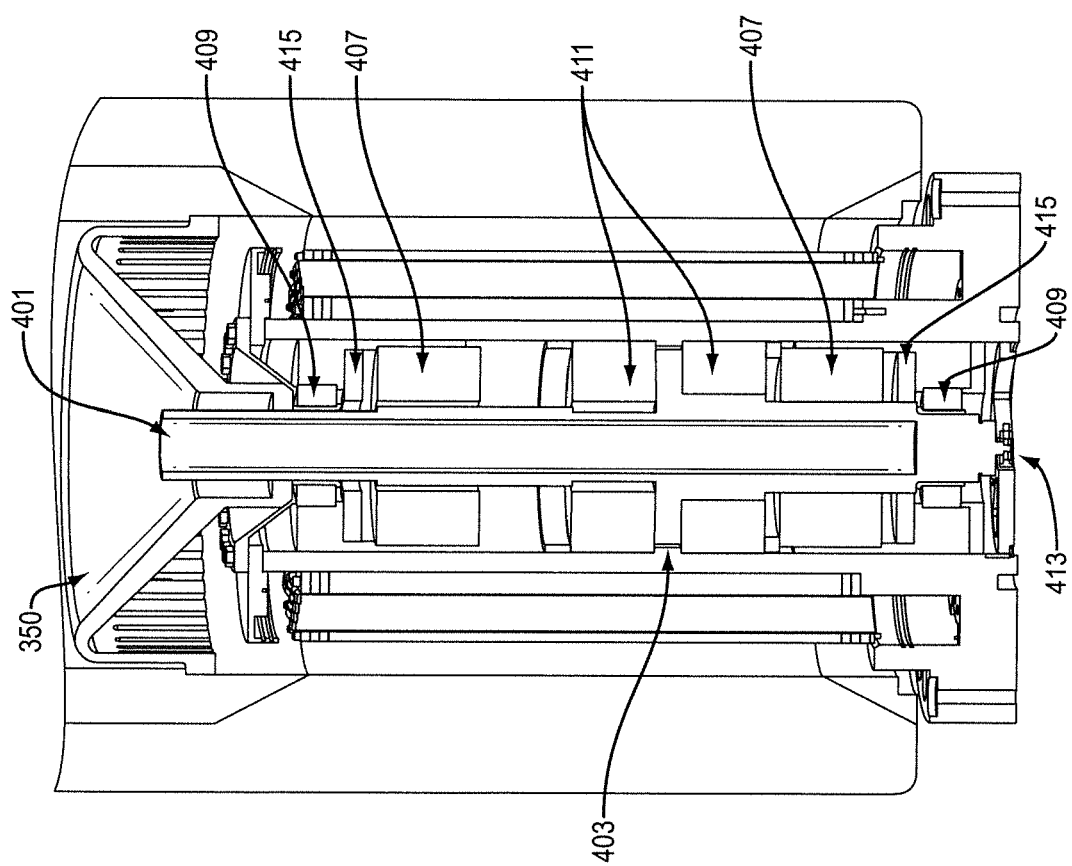
FIG. 9 is a cross-sectional view of a flywheel bearing-rotor shaft assembly in accordance with various embodiments.
Figure 10:
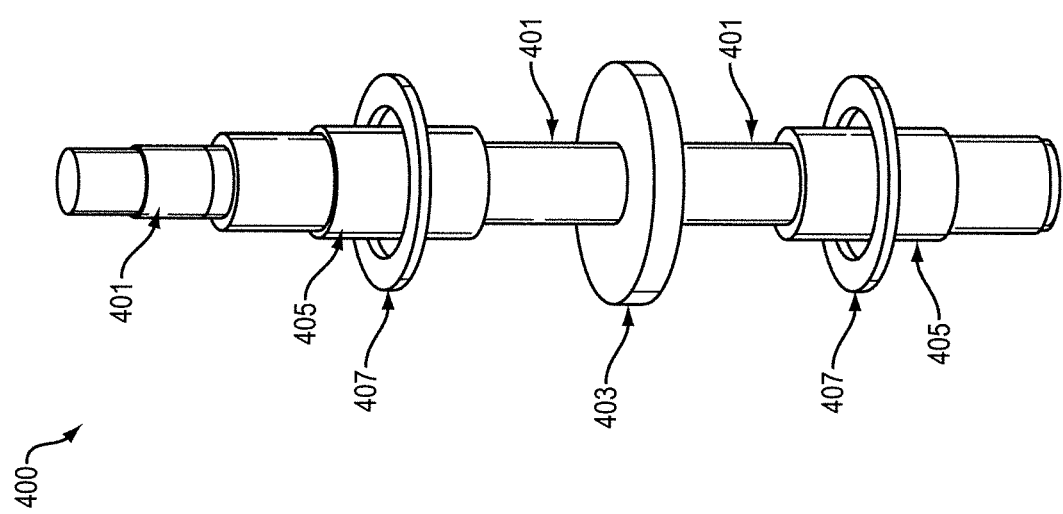
FIG. 10 is a perspective view of a flywheel rotor shaft in accordance with various embodiments.

Referring now to FIGS. 9 and 10, a shaft assembly 400 is provided including a rotor shaft 401 extending along the longitudinal axis of the flywheel 100 for providing a center of rotation of the rotor 300. That is, the shaft assembly 400, particularly the rotor shaft 401, does not carry any stress load other than its own free hoop during rotation and instead provides only a center of rotation for the rotor 300 via interconnection with the rotor hub 350.

The shaft 401, in some embodiments, can be any suitable length (e.g., about 45" long) and can have any suitable diameter or range of diameters along a longitudinal length thereof. For example, the shaft may be between about 1" to about 12" in diameter. For example, in some embodiments, the shaft 401 may have a core shaft diameter of about 4" expandable to a flange 403 having a diameter of about 10". In accordance with various embodiments, the shaft can be constructed of any suitable material, including, for example, composites, metals such as low carbon alloy steels (e.g. 4130 or 4340), any other suitable material, or combinations thereof. In some embodiments, the shaft 401 can be hollow, wherein an inner diameter of the shaft 401 is sized for tuning the rotor dynamics $1^{st}$ translation and $1^{st}$ bending mode natural frequencies of the shaft 401. For example, a 4" diameter hollow shaft can include an inner diameter of about 2.75".

As shown in FIGS. 1 and 9, the shaft 401 rotates on two magnetic radial bearings 407, a backup mechanical radial bearing 409, and a thrust bearing 411. The two magnetic radial bearings 407, in cooperation with the shaft 401, define the system centerline. Additionally, the flywheel 100, as shown in FIG. 1, includes an upper radial bearing 415 rotatable about a flywheel barrel 430 extending between the shaft 401 and a lid 650 of the flywheel 100 proximate the second end of the flywheel 100. The upper radial bearing 415 provides additional structural support and centering of the rotor 300 at the second end of the flywheel 100 to prevent tilt or other imbalancing of the rotor 300.

In order to provide improved shaft 401/bearing 407 wear life, there are bearing sleeves 405 disposed about the shaft 401 where each of the magnetic radial bearings 407 and a backup, mechanical bearing 409 interface with the shaft. The sleeves 405 can be made of any suitable material, including, for example, any metal such as 321 stainless steel or any other suitable for increasing bearing wear life of the shaft 401. Additionally, the flywheel 100 can create substantial axial thrust (up/down) loads during operations. Such axial thrust is generally reacted out by interaction of a thrust bearing 411 acting on the flange 403. In order to measure operational conditions of the flywheel 100, in some embodiments, the shaft assembly 400 can also include one or more sensors. For example, as shown in FIG. 9 the shaft assembly can include a shaft position encoder 413 and/or a radial position sensor 415 for detecting longitudinal and radial position of the shaft 401.

Figure 11B:
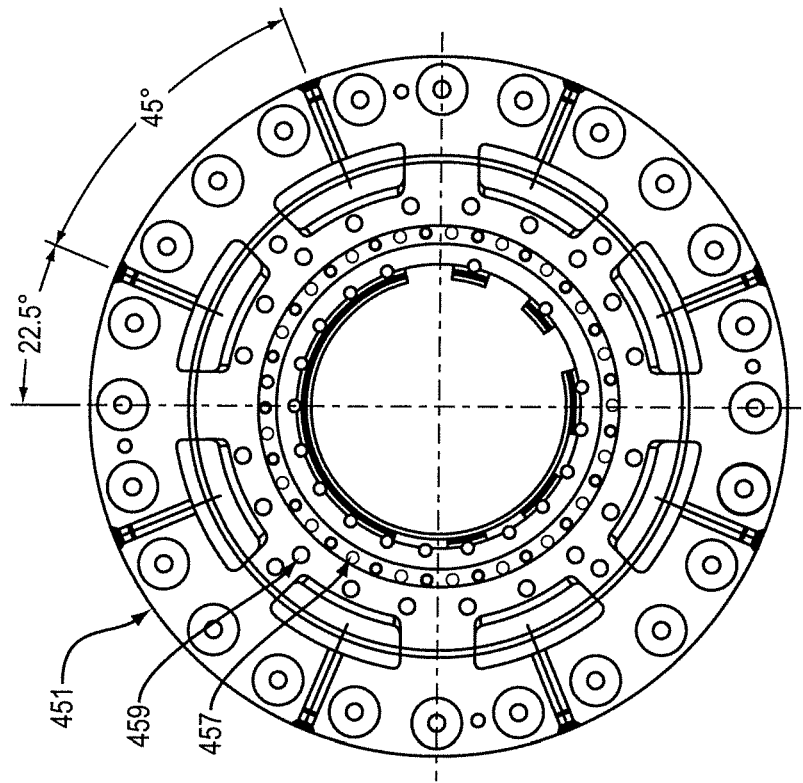
FIG. 11B is a top view of the flywheel bearing housing of FIG. 5A in accordance with various embodiments.
Figure 11A:
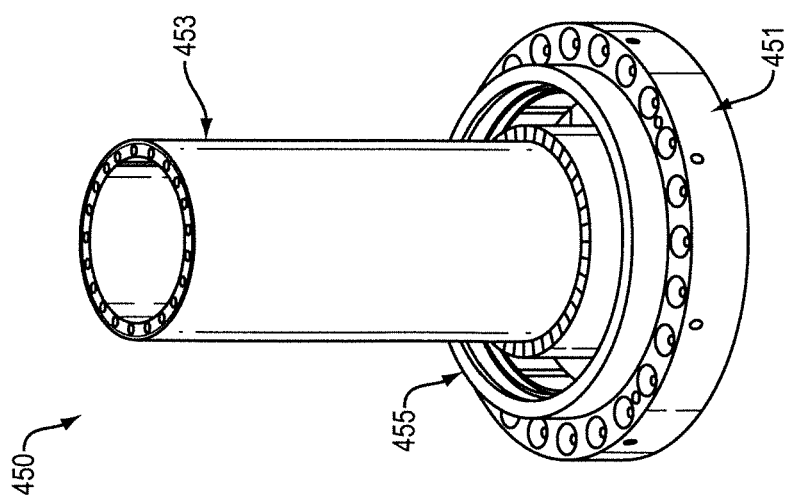
FIG. 11A is a perspective view of a flywheel bearing housing in accordance with various embodiments.
Figure 12B:
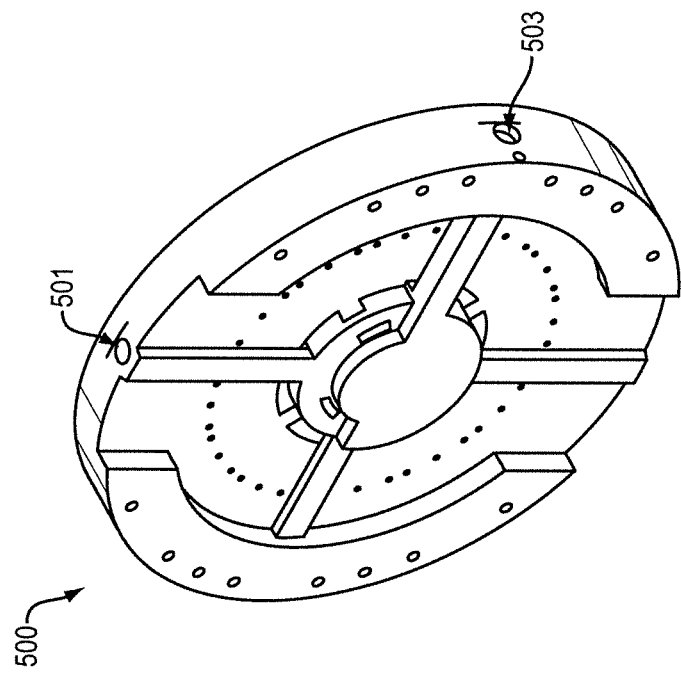
Figure 12A:
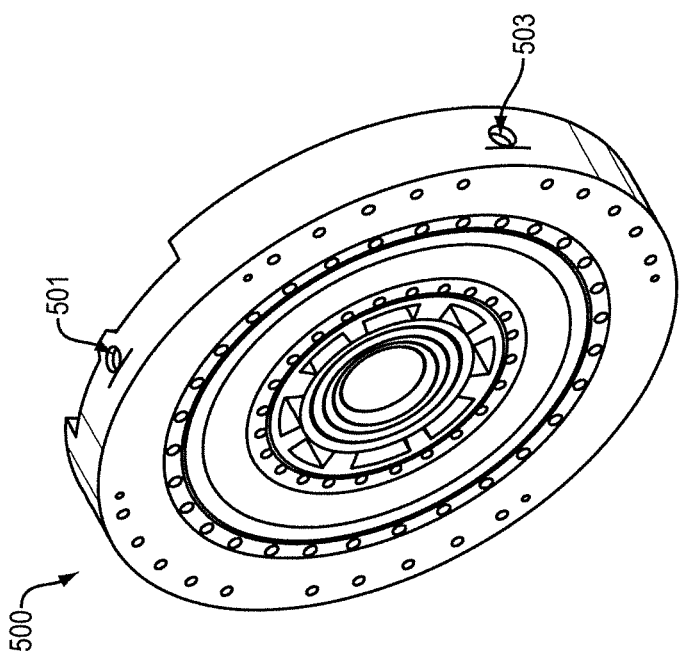

Referring now to FIGS. 11a and 11B, the bearing housing 450 includes a base 451 mountable to a baseplate 500 of the flywheel 100 and providing interface passages corresponding to any service ports in the baseplate 500. The bearing housing 450 also includes a bearing containment column 453 extending upward therefrom. The containment column 453 provides an outer diameter interface for the magnetic bearings 407, 411. The bearing containment column 453 can be substantially cylindrical and sized to be interposed between the shaft assembly 400 and the stator assembly 200 for containing the bearings 407, 411 and the shaft 401 during operation. Similarly, the bearing containment column can be any suitable length for containing the bearings 407, 411 and shaft 401. For example, in some embodiments, bearing containment column 453 can be about 40" long and about one foot in diameter over the length providing bearing interface.

The bearing housing 450 can also serve as an interface for the stator poles 205/windings 207 as well as a pass-through for cooling services to the stator assembly 200. In particular, the bearing housing 450 includes a sealing flange 455 extending upward therefrom for sealing against the outer body 203 of the stator assembly 200 to permit maintenance of the pumped vacuum at the stator 200-rotor 300 interface and prevent coolant leakage. The bearing housing 450 also includes supply passages 457 extending through the base 451 to permit coolant to pass from a supply port 501 of the baseplate 500 into the inlets 209 of the stator assembly 200 and drain passages 459 extending through the base 451 to permit coolant cascading over the windings 207 to exit the stator assembly 200 into a drain port 503 of the baseplate 500 for external chilling and recirculation.

The bearing housing 450 can generally be formed as a single piece such as, for example, a machined forging, precision casting, machined casting, or combinations thereof). The bearing housing can be constructed from any suitable material, such as, for example, cast A 536 Grade 80-55-06.

Baseplate

The baseplate 500 provides a stable base for the flywheel 100, including fastener holes for attachment of the flywheel 100 to a concrete foundation, as well as being wide enough and heavy enough to help counteract extreme loads in the event of a rotor release. For example, in some embodiments the baseplate 500 can have a diameter of about 60" and be about 8" thick.

Figure 13:
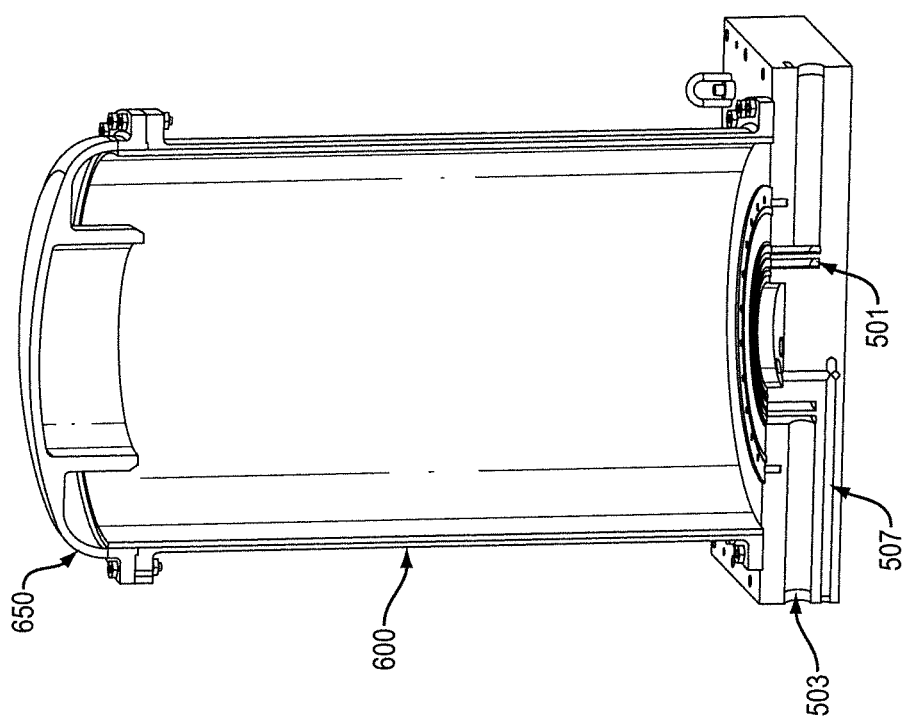
FIG. 13 is a cross-sectional view of a flywheel housing assembly in accordance with various embodiments.

Furthermore, the baseplate 500 can provide a housing and attachment site for flywheel services and wires. For example, as shown in FIGS. 12A, 12B, 12C, and 13 the baseplate 500 includes coolant supply ports 501 and drain ports 503, vacuum ports 505. In addition, as shown in FIG. 13, wire connections 507 are provided for the stator windings as well as for any shaft position encoders 413 or other sensors. The baseplate 500 also serves as the resting plate and neutral anchor point for the rotor shaft 401, bearing housing 450, and flywheel housing 600.

Flywheel Housing and Lid

Referring now to FIG. 13, the flywheel housing 600 and Lid 650 are configured to act as a containment vessel and, in combination with the baseplate 500, to provide necessary sealing for the flywheel system to operate in a vacuum. In some embodiments, the housing 600/lid 650 structure can be configured to be much heavier than a loose rotor and the lid 650 in particular can be configured to resist the extreme vertical load of a loose rotor. To that end, in some embodiments, the flywheel housing 600 can be, for example, 0.5" thick and made of 304 stainless steel or similarly high strength material. The lid 650 can also made of 0.5" 304 stainless steel. In some embodiments, the housing 600 can be secured to the baseplate 500 with 30 one inch bolts and similarly, to the lid 650 with an additional 30 one inch bolts.

Containment Liner

Referring now to FIG. 14, a containment liner 700 can be positioned around the rotor 300 inside the housing 600. In some embodiments, the containment liner can be positioned such that it is free to spin between the rotor 300 and the housing 600. In general, the containment liner absorbs the angular momentum of a burst or overspeed flywheel rotor 300. Because the containment liner 700 is free to spin between the housing 600 and the rotor 300, the containment liner 700 will rotate on contact in the event of a rotor burst and, as such, will absorb some, or even all, of the rotor's 300 angular momentum energy in the event of a burst. In order to withstand or at least partially absorb such an event, the containment liner can generally be about 0.5" thick and constructed from 4130 steel or a similarly strong, ductile material.

External Components

Figure 15:
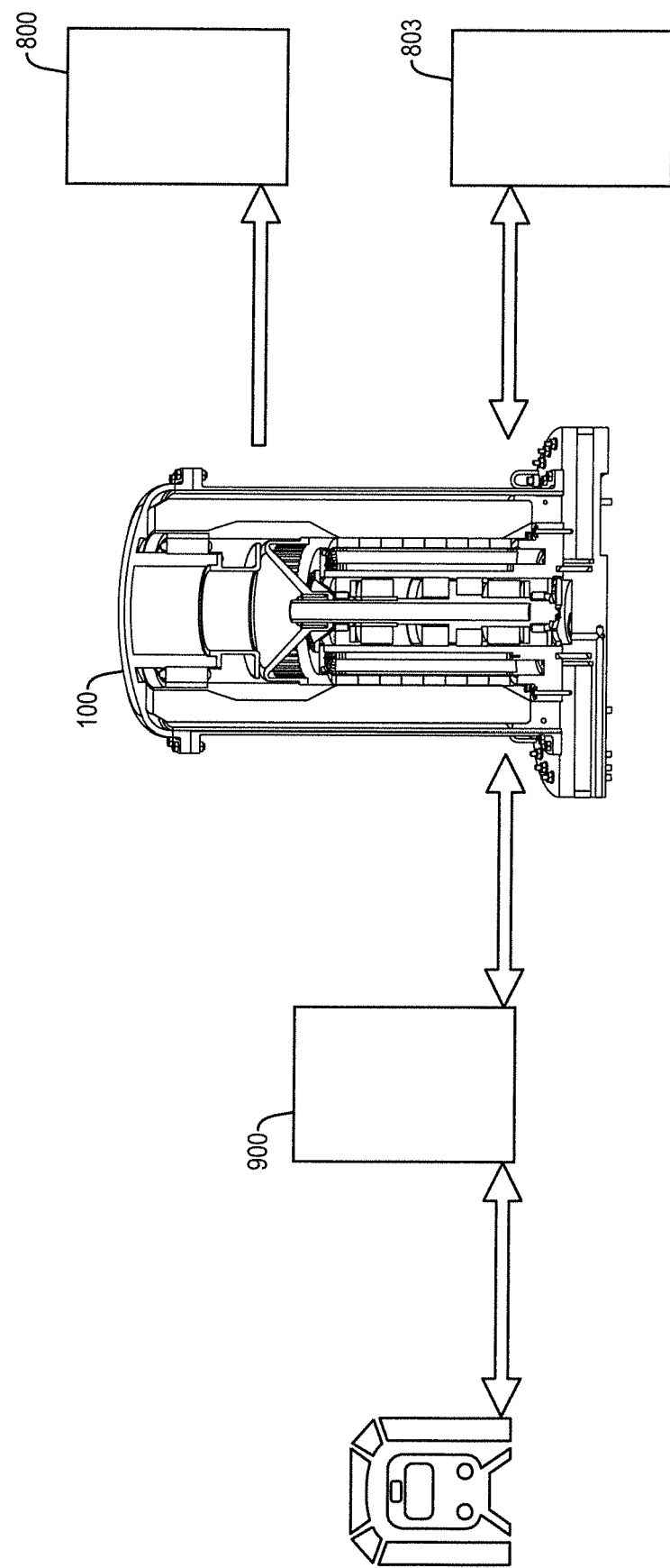
FIG. 15 is a system diagram of a flywheel system for use in connection with a rapid transit rail system.

Referring now to FIG. 15, in some embodiments, external components such as a separate power electronics/motor control cabinet 900 can be used to control operation of the flywheel 100. Additionally, in some embodiments, an external vacuum pump system 801 can be used to maintain a pumped vacuum within the flywheel 100. Furthermore, a cooling system pump and heat exchanger 803 can be provided for cooling and recirculation of coolant flowing through the flywheel 100.

In general, the vacuum pump system 801 keeps the chamber in which the flywheel operates at vacuum conditions of well less than 1 torr. In some embodiments, the vacuum pump system can include, for example, a 7CFM, two-stage, rotary vane vacuum pump and accompanying active vacuum switch and transmitter. However, it will be apparent in view of this disclosure that any vacuum pump system 801 suitable for maintaining a desired vacuum in a particular size and configuration of flywheel 100 can be used in accordance with various embodiments.

In order to dissipate heat generated by the flywheel 100, the coolant pump/heat exchanger 803 can include, for example, a 65,000 BTU/hr fan cooled heat sink, a 45-gallon reservoir, and a coolant filter (e.g., a 25-micron filter), and a 14-20 gallon per minute coolant pump. However, it will be apparent in view of this disclosure that any coolant pump/ heat exchanger 803 suitable for cooling a particular size and configuration of flywheel 100 can be used in accordance with various embodiments.

Power Electronic/Motor Controller

Figure 16:
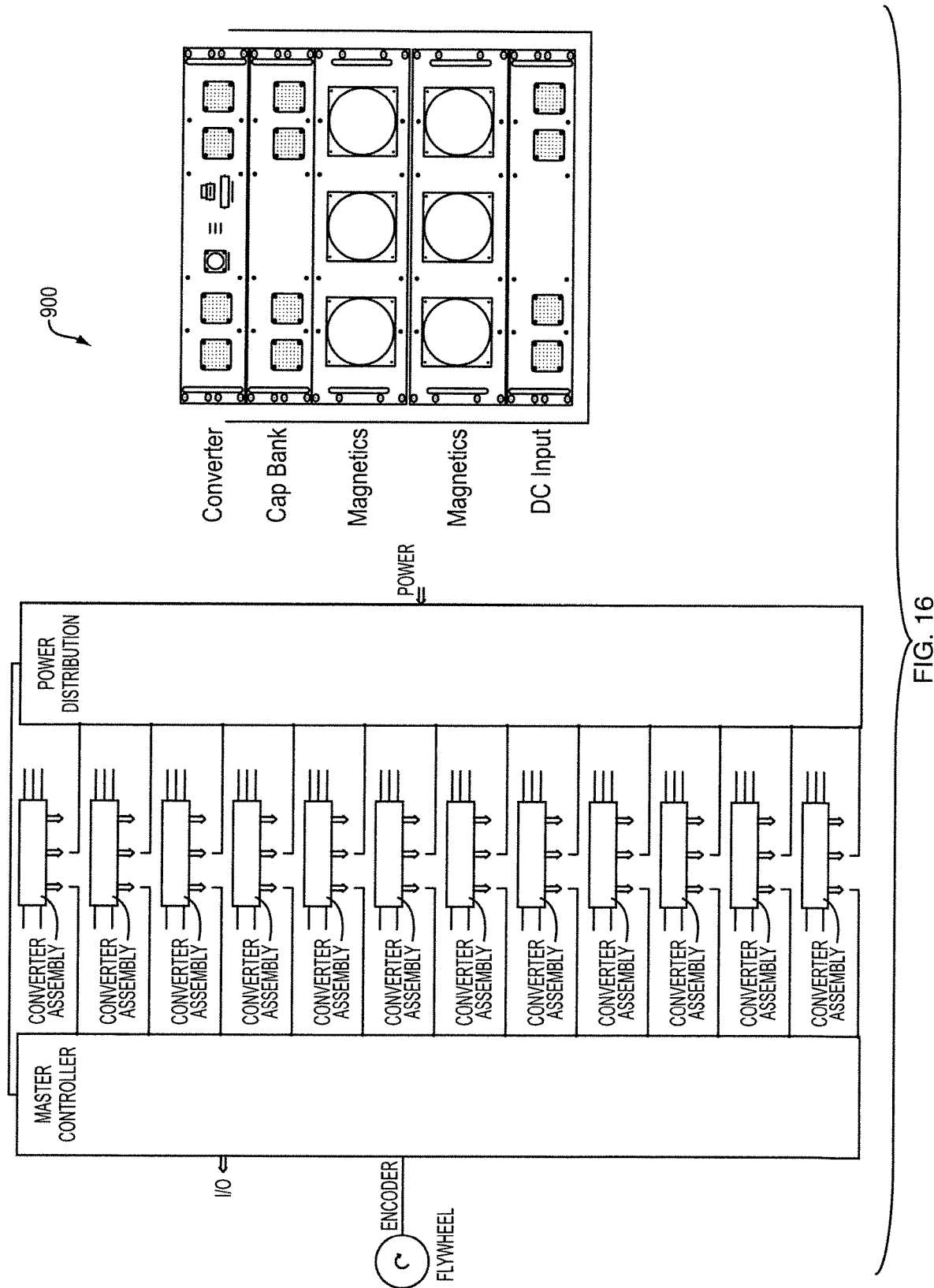
FIG. 16 is an electrical schematic of a flywheel power electronics system in accordance with various embodiments.

Referring now to FIG. 16, an exemplary motor controller/power electronic unit 900 is shown. In general, the motor controller/power electronic unit 900 provides a connection between the live $3^{rd}$ rail and the flywheel. It, effectively, tells the flywheel when to store energy and spin the wheel in "motor mode" and when to discharge energy back to the system and operate in "generator mode". This is the "motor controller" function.

The motor controller/power electronic unit 900 also provides the regulation capability to allow the $3^{rd}$ rail to accept the energy from the regenerative braking system. In particular, the motor controller/power electronic unit 900 regulates the amount of current delivered from the flywheel to the third rail to avoid overloading the third rail during discharge.

Rapid Rail Transit Embodiment

As shown in FIG. 15, a flywheel 100 as described herein can be used in connection with a rapid rail transit system 800. Rail cars today dissipate large amounts of energy when braking. However, rapid transit systems have not been able to utilize regenerative braking because there is no power management system to be able to absorb and store the energy from the $3^{rd}$ rail and then deploy the energy back into the $3^{rd}$ rail. Due to energy savings, peak power reduction and lower T&D costs, this is an untapped market nearly $10B in size. By diverting the energy from the $3^{rd}$ rail into one or more flywheels 100 as described herein, such energy can be stored and then released back into the rail system to, for example, deliver power for accelerating the rail car upon departure from the station. Thus, the flywheel systems described herein provide safe operation of a power management system to be able to capture the savings associated with regenerative braking.

As shown in FIG. 15 and described above, the flywheel 100 itself is operated in conjunction with external components such as a separate power electronics/motor control cabinet 900 can be used to control operation of the flywheel 100. Additionally, in some embodiments, an external vacuum pump system 801 can be used to maintain a pumped vacuum within the flywheel 100. Furthermore, a cooling system pump and heat exchanger 803 can be provided for cooling and recirculation of coolant flowing through the flywheel 100.

In a rapid transit context, the motor controller/power electronic unit 900 provides the connection between the live $3^{rd}$ rail and the flywheel. It, effectively, tells the flywheel when to store energy and spin the wheel in "motor mode" and when to discharge energy back to the system and operate in "generator mode". That is, the motor controller/power electronic unit 900 provides the regulation capability to allow the $3^{rd}$ rail to accept the energy from the regenerative braking system.

In particular, without a gating mechanism and a "sink" such as the flywheel assembly 100, introducing all of the regenerative braking energy to the third rail during braking would over-load the third rail. This phenomenon, in conventional rapid transit systems, causes most of the energy produced by a regenerative braking system to be dissipated (wasted) in resistor banks on the roof of the train. By using the motor controller/power electronic unit 900 to shunt the regenerative braking energy from the $3^{rd}$ rail to the flywheel assembly 100 (the "sink"), a high percentage of the regenerative braking energy can be diverted to the flywheel assembly 100 for storage and subsequent, more gradual discharge when needed, without overloading the third rail. Thereby, the energy produced by the regenerative braking can be captured and used, rather than dissipated and wasted. In practice, the regenerative braking power (electrical current) comes into the $3^{rd}$ rail by design of the braking system.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

What is claimed is:

1. A rotor hub for connecting a shaft to a rotor, the rotor hub comprising:
    a frustoconical body having a base, a frustum configured to mate with a surface of the shaft, and a longitudinal axis extending therebetween; and
    a plurality of elongated protrusions spaced about a circumference of the base and extending from the base parallel to the longitudinal axis and in a direction of the frustum;
    each elongated protrusion terminating in an end which includes a contact pad configured to mate with a surface of the rotor.

2. The rotor hub of claim 1, wherein, upon rotation of the rotor hub and the rotor, the elongated protrusions are configured to flex radially outward to maintain contact between the contact pads and the surface of the rotor and to maintain concentricity between the rotor hub and the rotor.

3. The rotor hub of claim 1, wherein the frustoconical body includes an opening angle of 50 degrees.

4. The rotor hub of claim 1, wherein the rotor hub is constructed from at least one of a metal, a composite, or combinations thereof.

5. The rotor hub of claim 4, wherein the rotor hub is constructed from at least one of aluminum or an aluminum alloy.

6. The rotor hub of claim 1, wherein the frustoconical body and the plurality of elongated protrusions are constructed as a single-piece rotor hub.

7. The rotor hub of claim 1, wherein an inner diameter of the frustum is configured to interconnect to a rotor shaft.

8. The rotor hub of claim 1, wherein the plurality of elongated protrusions includes 24 elongated protrusions evenly spaced about the circumference of the base.

9. The rotor hub of claim 1, wherein each of the plurality of elongated protrusions is six (6) inches long.

10. The rotor hub of claim 1, wherein each of the plurality of elongated protrusions is 0.5 inches thick.

11. The rotor hub of claim 1, wherein each of the plurality of elongated protrusions is 1.2 inches wide.

12. The rotor hub of claim 1, wherein each of the contact pads is 1.5 inches long.

13. The rotor hub of claim 1, wherein each of the plurality of contact pads is 1.1 inches thick.

14. The rotor hub of claim 1, wherein each of the plurality of contact pads is 1.2 inches wide.

* * * * *